(12) United States Patent
Wu et al.

(10) Patent No.: US 10,871,832 B2
(45) Date of Patent: Dec. 22, 2020

(54) METHOD AND DEVICE FOR OBTAINING OPERATION ENTRY, AND STORAGE MEDIUM

(71) Applicant: Beijing Xiaomi Mobile Software Co., Ltd., Beijing (CN)

(72) Inventors: Liangxiong Wu, Beijing (CN); Ming Liu, Beijing (CN); Yanfei Luo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/020,798

(22) Filed: Jun. 27, 2018

(65) Prior Publication Data
US 2019/0018502 A1    Jan. 17, 2019

(30) Foreign Application Priority Data
Jul. 17, 2017    (CN) .......................... 2017 1 0581340

(51) Int. Cl.
*G06F 3/048*    (2013.01)
*G06F 3/023*    (2006.01)
(Continued)

(52) U.S. Cl.
CPC ........ *G06F 3/0237* (2013.01); *G06F 3/04883* (2013.01); *G06F 16/90344* (2019.01); *G06F 16/9535* (2019.01); *G06F 16/9558* (2019.01)

(58) Field of Classification Search
CPC ............. G06F 3/0237; G06F 17/30882; G06F 17/30985; G06F 3/04883
See application file for complete search history.

(56) References Cited

U.S. PATENT DOCUMENTS

| 9,129,012 B2 | 9/2015 | Lebeau et al. |
| 2007/0050351 A1 | 3/2007 | Kasperski et al. |

(Continued)

FOREIGN PATENT DOCUMENTS

| CN | 102314439 A | 1/2012 |
| CN | 103092962 A | 5/2013 |

(Continued)

OTHER PUBLICATIONS

Extended European Search Report dated Oct. 11, 2018 in European Patent Application No. 18183920.0, citing documents AA, AB and AC therein, 10 pages.

(Continued)

*Primary Examiner* — Rashawn N Tillery
(74) *Attorney, Agent, or Firm* — Oblon, McClelland, Maier & Neustadt, L.L.P.

(57) ABSTRACT

The present disclosure discloses a method and an information processing apparatus. The method includes obtaining a first character string entered using an input method in a present input page. Further, a second character string corresponding to a keyword associated with an operation task is obtained from a server device. The first character string is identified and matched to the second character string. When the identified first character string is determined to match the second character string, activity information of the operation task corresponding to the second character string is obtained. An operation entry that is a link used to jump to a page of the operation task is generated and displayed in the present input page.

17 Claims, 4 Drawing Sheets

(51) Int. Cl.
  *G06F 16/9535* (2019.01)
  *G06F 16/955* (2019.01)
  *G06F 16/903* (2019.01)
  *G06F 3/0488* (2013.01)

(56) References Cited

U.S. PATENT DOCUMENTS

| | | | |
|---|---|---|---|
| 2010/0223133 A1* | 9/2010 | Scott | G06Q 30/02 |
| | | | 705/14.54 |
| 2011/0191364 A1 | 8/2011 | Lebeau et al. | |
| 2012/0246165 A1 | 9/2012 | Batraski et al. | |
| 2012/0251005 A1* | 10/2012 | Tonouchi | G06F 3/018 |
| | | | 382/187 |
| 2013/0041890 A1* | 2/2013 | Nakayama | G06F 17/2735 |
| | | | 707/722 |
| 2014/0123065 A1* | 5/2014 | Bos | G06F 3/0237 |
| | | | 715/816 |
| 2015/0032741 A1* | 1/2015 | Liu | G06F 16/90328 |
| | | | 707/725 |
| 2016/0063118 A1* | 3/2016 | Campbell | G06F 16/9535 |
| 2017/0061485 A1 | 3/2017 | Batraski et al. | |

FOREIGN PATENT DOCUMENTS

| | | |
|---|---|---|
| CN | 104077287 A | 10/2014 |
| CN | 105183185 A | 12/2015 |
| CN | 106605224 A | 4/2017 |

OTHER PUBLICATIONS

Combined Chinese Office Action and Search Report dated Apr. 23, 2019 in Chinese Patent Application No. 201710581340.1(with English translation of Category of Cited Documents), citing documents AO through AS therein, 6 pages.

* cited by examiner

METHOD AND DEVICE FOR OBTAINING OPERATION ENTRY, AND STORAGE MEDIUM

CROSS-REFERENCE TO RELATED APPLICATION

This application is based on and claims the priority to the Chinese patent application No. 201710581340.1 filed on Jul. 17, 2017, the entire contents of which are incorporated herein by reference.

TECHNICAL FIELD

The present disclosure relates to the technical field of information processing.

BACKGROUND

At present, one manner for inserting an active entry in a display device includes that in a global search of a system, an active entry appears after determining that a specific word has been entered.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

In order to overcome the problems in the related art, the present disclosure provides a method and an information processing apparatus for obtaining operation entry, and a storage medium.

According to an aspect of the present disclosure, the method is provided. The method includes obtaining a first character string entered using an input method in a present input page. Further, a second character string corresponding to a keyword associated with an operation task is obtained from a server device. The first character string is identified and matched to the second character string. When the identified first character string is determined to match the second character string, activity information of the operation task corresponding to the second character string is obtained. An operation entry that is a link used to jump to a page of the operation task is generated and displayed in the present input page.

In an example, the method further includes jumping to the page of the operation task corresponding to the operation entry when a trigger operation for the operation entry is received.

In some examples, the method includes receiving an updated keyword associated with the operation task from the server device when the operation task is changed. The method also includes acquiring an updated keyword associated with the operation task from the server device periodically or at preset times.

In an example, the method includes detecting a character that is entered most recently using the input method. The character is included in the present first character string. The method further includes identifying the present first character string, and matching the present first character string to the second character string.

In an example, before entering the first character string is finished, the method includes obtaining a present matching result between the present first character string and the second character string. When the present matching result is different from a previous matching result between the previous first character string and the second character string, the method includes updating the present input page by displaying the operation entry corresponding to the present matching result in the present input page.

In an example, the method includes determining whether the identified first character string is included in the second character string. When the identified first character string is determined to be included in the second character string, the method includes determining that the identified first character string matches the second character string.

In an example, the method further includes obtaining additional keywords associated with the operation task from the server device, the additional keywords including a start time and an end time of the operation task. The method includes obtaining a present time by the information processing apparatus. When the present time is between the start time and the end time and the identified first character string is determined to match the second character string, the method includes obtaining the activity information of the operation task corresponding to the second character string. The method also includes generating the operation entry that is the link used to jump to the page of the operation task, and displaying the operation entry in the present input page.

In an example, the second character string corresponds to multiple operation tasks. The method further includes identifying, based on a preset rule, one of the multiple operation tasks to be the operation task, and generating the operation entry that is the link used to jump to the page of the operation task. Alternatively, the method includes generating multiple operation entries corresponding to the multiple operation tasks and displaying the multiple operation entries in the present input page. Further, the method includes identifying, based on user selection by a user, one of the multiple operation entries to be the operation entry, and operating using the operation entry.

According to an aspect of the present disclosure, the information processing apparatus is provided. The information processing apparatus includes interface circuitry and processing circuitry. The interface circuitry is configured to obtain a first character string entered using an input method in a present input page. The processing circuitry is configured to obtain, from a server device, a second character string corresponding to a keyword associated with an operation task. Further, the processing circuitry is configured to identify the first character string, and match the identified first character string to the second character string. When the identified first character string is determined to match the second character string, the processing circuitry is configured to obtain activity information of the operation task corresponding to the second character string, generate an operation entry that is a link used to jump to a page of the operation task, and display the operation entry in the present input page.

According to an aspect of the application, a non-transitory computer-readable storage medium is provided. The non-transitory computer-readable storage medium stores a program executable by a processor to perform obtaining a first character string entered using an input method in a present input page. The program causes the processor to perform obtaining, from a server device, a second character string corresponding to a keyword associated with an operation task. The program causes the processor to perform identifying the first character string, and matching the identified first character string to the second character string. When the identified first character string is determined to match the second character string, the program causes the processor to perform obtaining activity information of the operation task corresponding to the second character string, generating an operation entry that is a link used to jump to a page of the operation task, and displaying the operation entry in the present input page.

It should be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

Figure 1:
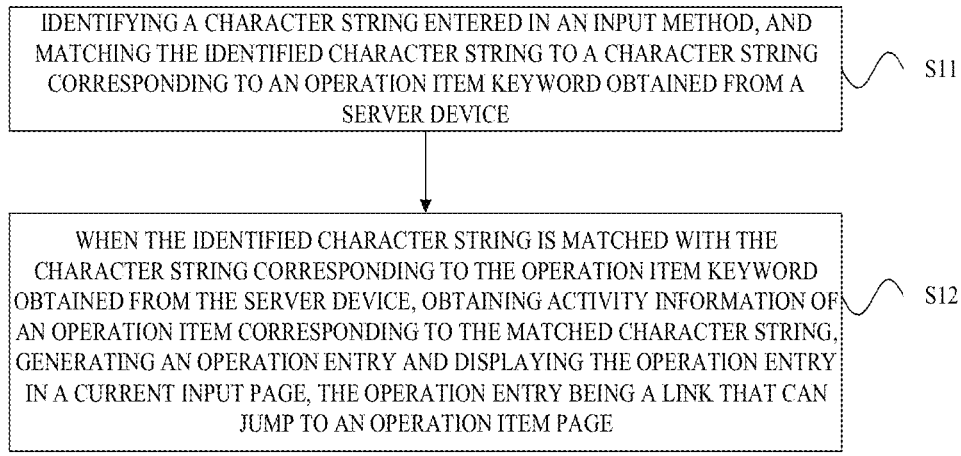
FIG. 1 is a flow chart of a method for obtaining operation entry according to an exemplary embodiment.

FIG. 1 is a flow chart of a method for obtaining operation entry according to an exemplary embodiment. As shown in FIG. 1, the method for obtaining operation entry is applicable to a terminal device and includes the following steps.

A step S11 is to identify a character string (or a first character string) entered in an input method, and match the identified character string to a character string (or a second character string) corresponding to an operation item (or an operation task) keyword obtained from a server device.

A step S12 is to, when the identified character string is matched with the character string corresponding to the operation item keyword obtained from the server device, obtain activity information of an operation item corresponding to the matched character string, generate an operation entry and display the operation entry in a current input page (or a present input page). The operation entry is a link that can jump to an operation item page.

In one embodiment, one user may enter a character string in an input interface of the input method, and the character string includes at least one character which may include at least one of a letter, a number, a symbol and the like. In one embodiment, the character string entered in the input method can be identified in real time, and the character string corresponding to the operation item keyword has been obtained from the server device, then the identified character string is matched to the character string corresponding to the operation item keyword obtained from the server device. When the identified character string is matched with the character string corresponding to the operation item keyword obtained from the server device, the activity information of the operation item corresponding to the matched character string is obtained, and one operation entry is generated according to the activity information and the operation entry is displayed in the current input page. For example, the operation entry may be displayed in the input interface of the input method in the current input page, or the operation entry may be displayed above the input interface of the input method in the current input page.

The operation entry may be the link that can jump to the operation item page. When the user operates the link, a page of the terminal device jumps to the operation item page. The above link may be, but are not limited to, an image link, a text link, or an image-text link, and so on. Optionally, the text may indicate contents of the activity information.

Note that the identified character string may be matched with one or more character strings corresponding to the operation item keyword obtained from the server device. When the one or more character strings are corresponding to one operation item, one operation entry is generated and is displayed in the current input page. When the one or more character strings are corresponding to several operation items, several operation entries are generated and are displayed in the current input page, and then the user may select one from the several operation items to operate. Alternatively, when the one or more character strings are corresponding to several operation items, one operation item is determined from the several operation items according to a preset rule, and then one operation entry may be generated and is displayed in the current input page. For example, the preset rule may be that one operation item with the largest number of matched character strings is determined as a final operation item, and this embodiment is not limited to the above example.

In summary, in the method for obtaining operation entry according to one embodiment, the character string entered in the input method is identified, and the identified character string is matched to the character string corresponding to the operation item keyword obtained from the server device. When the identified character string is matched with the character string corresponding to the operation item keyword obtained from the server device, the activity information of the operation item corresponding to the matched character string is obtained, and an operation entry is generated and is displayed in the current input page. The operation entry is a link that can jump to an operation item page. According to this embodiment, one operation entry can be displayed in the current input page as long as the character string entered by the user in the input method is matched with the character string corresponding to the operation item keyword, thereby simplifying the operation process, improving the efficiency of obtaining the link that can jump to the operation item page, realizing a function of displaying operation entries based on the input method and then expanding an application scope of the input method.

Figure 2:
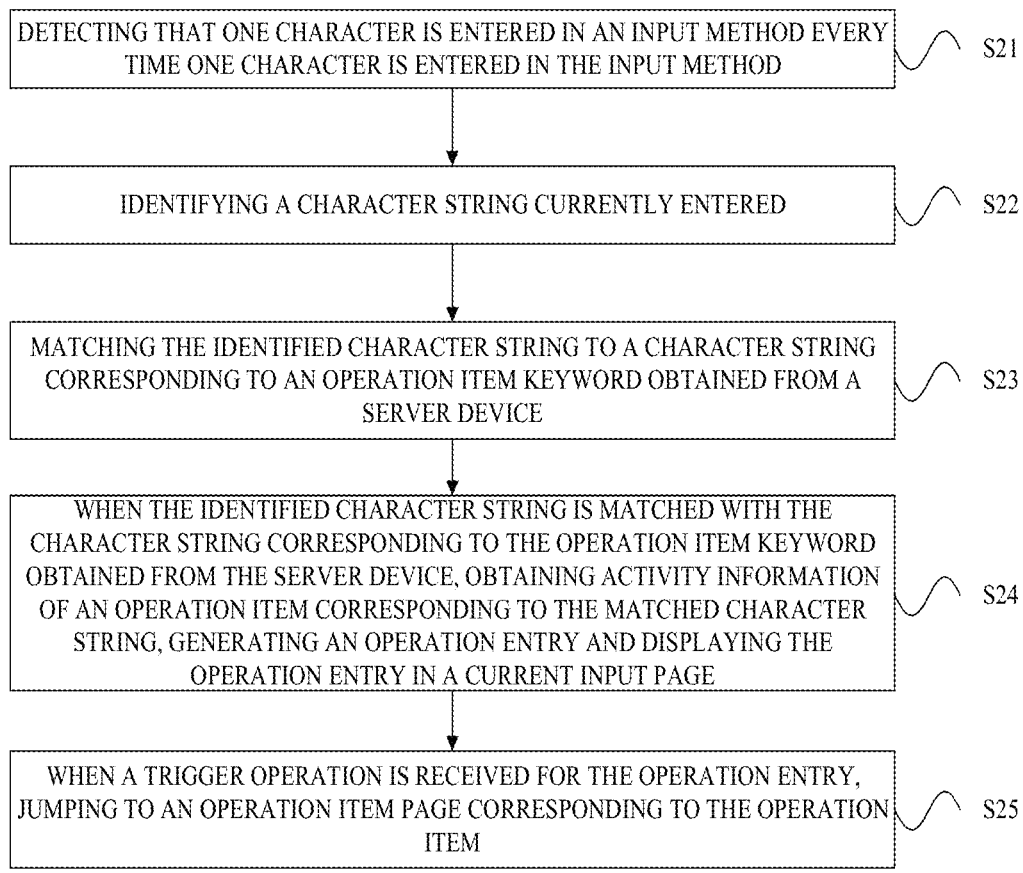
FIG. 2 is a flow chart of a method for obtaining operation entry according to another exemplary embodiment.

FIG. 2 is a flow chart of a method for obtaining operation entry according to another exemplary embodiment. As shown in FIG. 2, the method for obtaining operation entry is applicable to a terminal device and includes the following steps.

A step S21 is to detect that one character is entered in an input method every time one character is entered in the input method.

A step S22 is to identify a character string currently entered.

A step S23 is to match the identified character string to a character string corresponding to an operation item keyword obtained from a server device.

One possible implementation of the above step S11 includes the above steps S21 to S23.

In one embodiment, the process that a user enters the character string in an input interface of the input method includes: successively entering, by the user, each character in the input interface of the input method. Thus, in this embodiment, it can be detected that one character is entered in the input method every time one character is entered in the input method. When it is detected that one character is entered in the input method every time one character is entered in the input method, the character string currently entered is identified, and then the identified character string currently entered is matched to the character string corresponding to the operation item keyword.

Optionally, one possible implementation of the step S23 includes: judging whether the identified character string is included in the character string corresponding to the operation item keyword obtained from the server device; if yes, determine that the identified character string is matched with the character string corresponding to the operation item keyword obtained from the server device; if not, determine that the identified character string is not matched with the character string corresponding to the operation item keyword obtained from the server device.

For example, the character string corresponding to the operation item keyword is "xiaomi", then when an identified character string entered in the input method includes the character string of "xiaomi", it is determined that the identified character string is matched with the character string "xiaomi" corresponding to the operation item keyword; otherwise, it is determined that the identified character string is not matched with the character string corresponding to the operation item keyword.

Optionally, after the above operation item keyword is updated, it is needed to obtain the updated operation item keyword.

In one implementation way, an updated operation item keyword is received from the server device when the operation item is changed. In other words, in one embodiment, when the operation item is changed, the server device pushes the updated operation item keyword, so as to ensure that the operation item keyword, which is matched to the identified character string entered in the input method, is up to date.

In another implementation way, the operation item keyword is acquired from the server device periodically or at preset times. When a periodic time or a preset time arrives, the operation item keyword is actively acquired from the server device, so as to ensure that the operation item keyword, which is matched to the identified character string entered in the input method, is up to date.

A step S24 is to, when the identified character string is matched with the character string corresponding to the operation item keyword obtained from the server device, obtain activity information of an operation item corresponding to the matched character string, generate an operation entry and display the operation entry in a current input page.

In one embodiment, the specific implementation process of the step S24 may refer to the descriptions related to the embodiment shown in FIG. 1 and will not be elaborated herein.

Before an end of an input, if a matching result between a character string currently entered and the character string corresponding to the operation item keyword obtained from the server device is different from a previous matching result, the input page is updated and displays an operation entry obtained according to the current matching result. Before an end of an input, when one character is still entered in the input method, thus the character string entered in the input method will be changed, and the matching result between the character string entered in the input method and the character string corresponding to the operation item keyword may also be changed. When the current matching result is not consistent with the previous matching result, activity information of the operation item corresponding to the currently matched character string is obtained and an operation entry for the current matching is generated, the current input page is updated and displays the operation entry obtained for the current matching. When the current matching result is consistent with the previous matching result, the operation entry displayed in the current input page remains unchanged.

Figure 3:
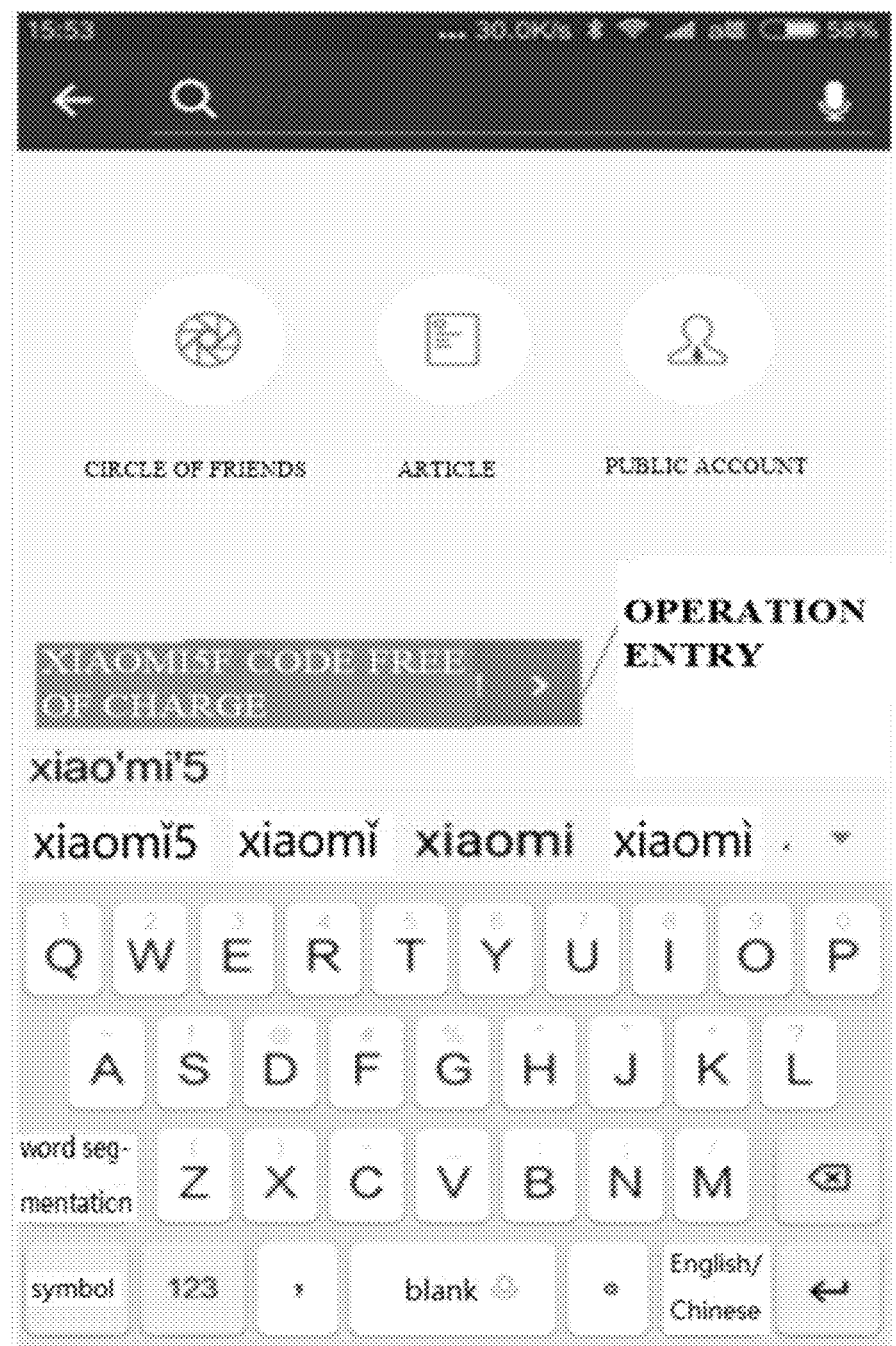
FIG. 3 is a schematic diagram showing operations of a method for obtaining operation entry according to an exemplary embodiment.

For example, character strings corresponding to the operation item keyword include "xiaomi" and "xiaomi5", and "xiaomi" and "xiaomi5" are corresponding to different activity information of an operation item. If a character string entered in the input method is "xiaomi", the matched character string is "xiaomi", then the activity information of the operation item corresponding to "xiaomi" is acquired, and then an operation entry corresponding to "xiaomi" is generated and displayed in the current input page. If this input is not finished and "5" is entered in the input method on the basis of "xiaomi", as shown in FIG. 3, the character string entered in the input method is "xiaomi5", then the matched character string is "xiaomi5", then the activity information of the operation item corresponding to "xiaomi5" is acquired, such as xiaomi 5F code free of charge, and then an operation entry corresponding to "xiaomi5" is generated and then the operation entry corresponding to "xiaomi" displayed in the current input page is replaced with the operation entry corresponding to "xiaomi5".

During the process of inputting character string in the input method, if the user clicks on an input end button, it means that the current input ends, if the user does not click on the input end button, it means that the current input does not end. For example, in the Chinese character input method, the input end button may be a space button or a numeric button, and so on; or, in some chat conversation pages, the input end button in the input method may be a send button, and this embodiment is not limited to the above examples.

Optionally, the method of one embodiment further includes a step S25.

The step S25 is to, when a trigger operation is received for the operation entry, jump to an operation item page corresponding to the operation item.

In one embodiment, the operation entry displayed in the current input page is a link which jumps to the operation item page. The user may perform the trigger operation for the operation entry displayed in the current input page through a touch panel or an input device (such as a mouse), and so on. In one embodiment, when the trigger operation is received for the operation entry, a current display page jumps to an operation item page corresponding to the operation item, i.e., displaying the operation item page in the current display page.

In summary, in the method for obtaining operation entry according to one embodiment, by the above solution, one operation entry can be displayed in the current input page as long as the character string entered by the user in the input method is matched with the character string corresponding to the operation item keyword, thereby simplifying the operation process, improving the efficiency of obtaining the link that can jump to the operation item page, realizing a function of displaying operation entries based on the input method and then expanding an application scope of the input method.

Optionally, the operation item keyword further includes: a start time and an end time of the operation item, for example, a start time of the xiaomi 5F code free of charge is at 0:00 on Jan. 1, 2017, and an end time of the xiaomi 5F code free of charge is at 24:00 on Jan. 2, 2017. When the current time (the present time) is in the time period between the start time and the end time of the operation item (for example, the current time is 8:00 on Jan. 1, 2017, which is in the time period from 0:00 on Jan. 1, 2017 to 24:00 on Jan. 2, 2017), then solutions of various embodiments of the present disclosure are performed, and what is displayed in the current display page is shown in FIG. 3. When the current time is not in the time period between the start time and the end time of the operation item (for example, the current time is 8:00 on Jan. 3, 2017, which is not in the time period from 0:00 on Jan. 1, 2017 to 24:00 on Jan. 2, 2017), then the solutions of various embodiments of the present disclosure are not performed, and the operation entry shown in FIG. 3 is not displayed in the current display page.

Device embodiments of the present disclosure are described hereinafter, and can be used to implement the method embodiments of the present disclosure. Details that are not disclosed in the device embodiments may refer to the method embodiments of the present disclosure.

Figure 4:
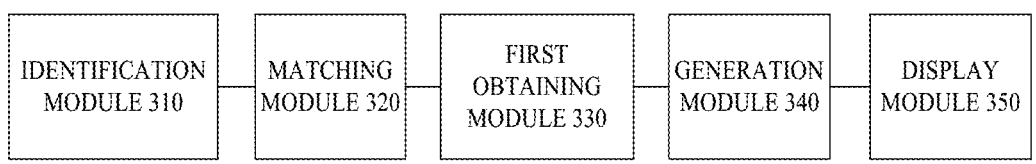
FIG. 4 is block diagram of a device for obtaining operation entry according to an exemplary embodiment.

FIG. 4 is block diagram of a device for obtaining operation entry according to an exemplary embodiment. The device for obtaining operation entry may be implemented as parts or all of an electronic device with a touch panel by software, hardware or a combination thereof. As shown in FIG. 4, the device includes an identification module 310, a matching module 320, a first obtaining module 330, a generation module 340 and a display module 350.

The identification module 310 is configured to identify a character string entered in an input method.

The matching module 320 is configured to match the identified character string to a character string corresponding to an operation item keyword obtained from a server device.

The first obtaining module 330 is configured to, when the matching module 320 determines that the identified character string is matched with the character string corresponding to the operation item keyword obtained from the server device, obtain activity information of an operation item corresponding to the matched character string.

The generation module 340 is configured to generate an operation entry according to the activity information.

The display module 350 is configured to display the operation entry in a current input page. The operation entry is a link that can jump to an operation item page.

With respect to the device in the above embodiments, the specific manners for performing operations in individual modules therein and corresponding technical effects have been described in detail in the embodiments regarding the related methods and will not be elaborated herein.

Figure 5:
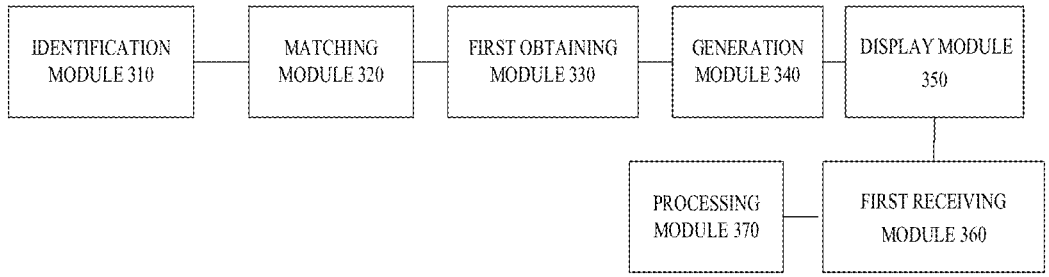
FIG. 5 is block diagram of a device for obtaining operation entry according to another exemplary embodiment.

FIG. 5 is block diagram of a device for obtaining operation entry according to another exemplary embodiment. The device for obtaining operation entry may be implemented as parts or all of an electronic device with a touch panel by software, hardware or a combination thereof. On the basis of the device embodiment shown in FIG. 4, the device shown in FIG. 5 further includes a first receiving module 360 and a processing module 370.

The first receiving module 360 is configured to receive a trigger operation for the operation entry.

The processing module 370 is configured to, when the first receiving module 360 receives the trigger operation for the operation entry, jump to an operation item page corresponding to the operation item.

With respect to the device in the above embodiments, the specific manners for performing operations in individual modules therein and corresponding technical effects have been described in detail in the embodiments regarding the related methods and will not be elaborated herein.

Figure 6:
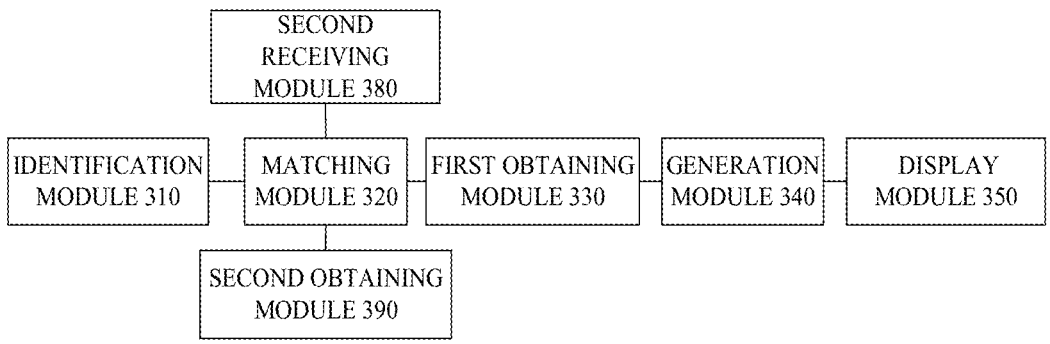
FIG. 6 is block diagram of a device for obtaining operation entry according to still another exemplary embodiment.

FIG. 6 is block diagram of a device for obtaining operation entry according to another exemplary embodiment. The device for obtaining operation entry may be implemented as parts or all of an electronic device with a touch panel by software, hardware or a combination thereof. On the basis of the device embodiment shown in FIG. 4 or FIG. 5, the device shown in FIG. 6 further includes a second receiving module 380 and/or a second obtaining module 390.

The second receiving module 380 is configured to receive an updated operation item keyword from the server device when the operation item is changed.

The second obtaining module 390 is configured to acquire the operation item keyword from the server device periodically or at preset times.

With respect to the device in the above embodiments, the specific manners for performing operations in individual modules therein and corresponding technical effects have been described in detail in the embodiments regarding the related methods and will not be elaborated herein.

Figure 7:
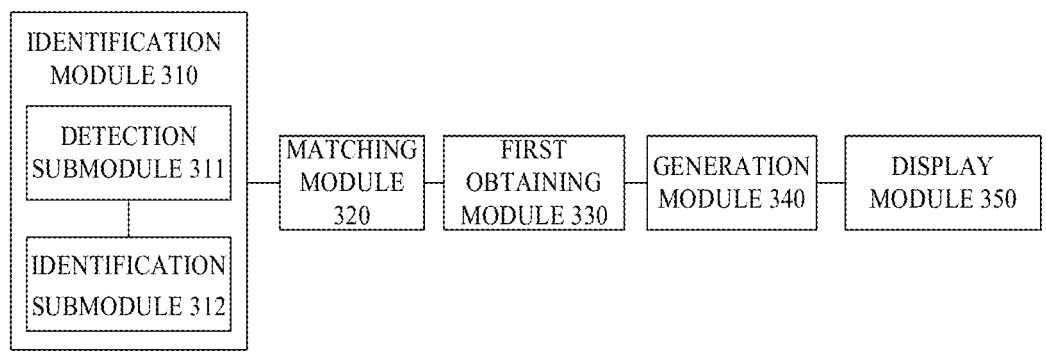
FIG. 7 is block diagram of a device for obtaining operation entry according to yet another exemplary embodiment.

FIG. 7 is block diagram of a device for obtaining operation entry according to another exemplary embodiment. The device for obtaining operation entry may be implemented as parts or all of an electronic device with a touch panel by software, hardware or a combination thereof. On the basis of any of the device embodiment shown in FIG. 4 to FIG. 6, the identification module 310 shown in FIG. 7 includes a detection submodule 311 and an identification submodule 312.

The detection submodule 311 is configured to detect that one character is entered in an input method every time one character is entered in the input method.

The identification submodule 312 is configured to identify a character string currently entered.

The matching module 320 is configured to match the character string currently identified by the identification submodule 312 to the character string corresponding to the operation item keyword obtained from the server device.

Optionally, the display module 350 is further configured to, before an end of an input, when the current matching result (the present matching result) between a character string currently entered and the character string corresponding to the operation item keyword obtained from the server device is not consistent with the previous matching result, update the input page and display the operation entry obtained for the current matching in the input page.

With respect to the device in the above embodiments, the specific manners for performing operations in individual modules therein and corresponding technical effects have been described in detail in the embodiments regarding the related methods and will not be elaborated herein.

Figure 8:
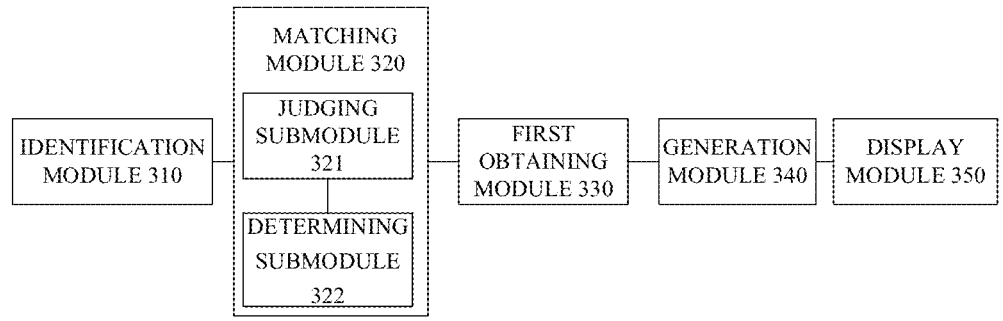
FIG. 8 is block diagram of a device for obtaining operation entry according to still yet another exemplary embodiment.

FIG. 8 is block diagram of a device for obtaining operation entry according to another exemplary embodiment. The device for obtaining operation entry may be implemented as parts or all of an electronic device with a touch panel by software, hardware or a combination thereof. On the basis of any of the device embodiment shown in FIG. 4 to FIG. 7, the matching module 320 includes a judging submodule 321 and a determining submodule 322.

The judging submodule 321 is configured to judge whether the identified character string is included in the character string corresponding to the operation item keyword obtained from the server device.

The determining submodule 322 is configured to, when the judging submodule 321 judges that the identified character string is included in the character string corresponding to the operation item keyword obtained from the server device, determine that the identified character string is matched with the character string corresponding to the operation item keyword obtained from the server device; when the judging submodule 321 judges that the identified character string is not included in the character string corresponding to the operation item keyword obtained from the server device, determine that the identified character string is not matched with the character string corresponding to the operation item keyword obtained from the server device.

With respect to the device in the above embodiments, the specific manners for performing operations in individual modules therein and corresponding technical effects have been described in detail in the embodiments regarding the related methods and will not be elaborated herein.

Further, one embodiment of the present disclosure provides a terminal device which includes a memory, a processor and computer process. The processor executes the computer process to implement the following method which includes:

identifying a character string entered in an input method, and matching the identified character string to a character string corresponding to an operation item keyword obtained from a server device, when the identified character string is matched with the character string corresponding to the operation item keyword obtained from the server device, obtaining activity information of an operation item corresponding to the matched character string, generating an operation entry and displaying the operation entry in a current input page. The operation entry is a link that can jump to an operation item page.

Optionally, the method further includes: when a trigger operation is received for the operation entry, jumping to an operation item page corresponding to the operation item.

Optionally, the method further includes: receiving an updated operation item keyword from the server device when the operation item is changed, and/or, acquiring the operation item keyword from the server device periodically or at preset times.

Optionally, identifying a character string entered in an input method, and matching the identified character string to a character string corresponding to an operation item keyword obtained from a server device, includes:

detecting that one character is entered in the input method every time one character is entered in the input method, identifying a character string currently entered, and matching the character string currently identified to the character string corresponding to the operation item keyword obtained from the server device.

Optionally, the method further includes: before an end of an input, when the current matching result between a character string currently entered and the character string corresponding to the operation item keyword obtained from the server device is not consistent with the previous matching result, updating the input page and displaying the operation entry obtained for the current matching in the input page.

Optionally, matching the identified character string to the character string corresponding to the operation item keyword obtained from the server device, includes: judging whether the identified character string is included in the character string corresponding to the operation item keyword obtained from the server device, when judging that the identified character string is included in the character string corresponding to the operation item keyword obtained from the server device, determining that the identified character string is matched with the character string corresponding to the operation item keyword obtained from the server device; when judging that the identified character string is not included in the character string corresponding to the operation item keyword obtained from the server device, determining that the identified character string is not matched with the character string corresponding to the operation item keyword obtained from the server device.

Figure 9:
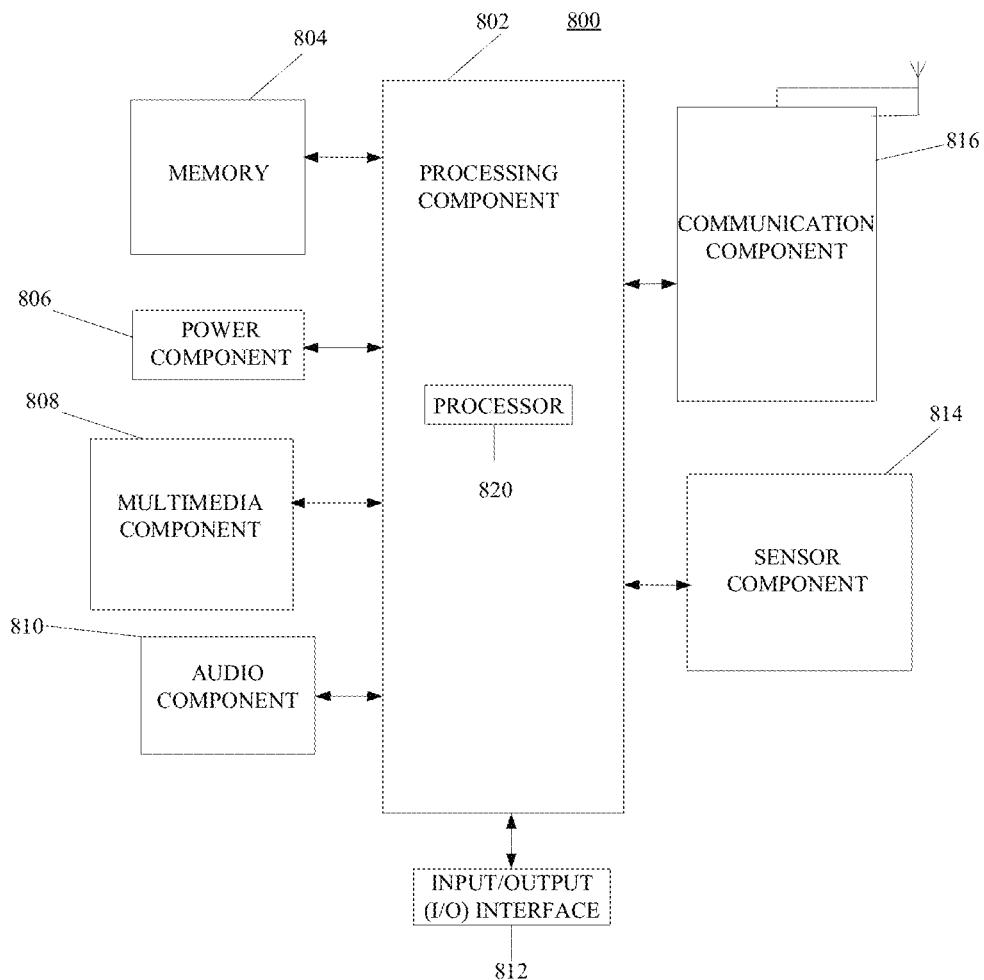
FIG. 9 is block diagram of a device 800 for obtaining operation entry according to an exemplary embodiment.

FIG. 9 is block diagram of a device 800 for obtaining operation entry according to an exemplary embodiment. For example, the device 800 may be a mobile phone, a computer, a digital broadcast terminal, a message transceiver, a gaming console, a tablet device, medical equipment, fitness equipment, a personal digital assistant or the like.

Referring to FIG. 9, the device 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the device 800, such as the operations associated with display, phone calls, data communications, camera operations and recording operations. The processing component 802 may include one or more processors 802 to execute instructions to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support operations of the device 800. Examples of such data include instructions for any applications or methods operated on the device 800, contact data, phonebook data, messages, pictures, video, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power device 806 may include a power supply management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device, relative positioning of components, e.g., the display and the keypad, of the device 800, a change in position of the device 800 or a component of the device 800, a presence or absence of user's contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor or a temperature sensor.

The communication component 816 is configured to facilitate communication, wired or wirelessly, between the device 800 and other devices. The device 800 can access a wireless network based on a communication standard, such as WiFi, 2G or 3G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of the device 800, causes the device to perform the following method which includes:

identifying a character string entered in an input method, and matching the identified character string to a character string corresponding to an operation item keyword obtained from a server device, when the identified character string is matched with the character string corresponding to the operation item keyword obtained from the server device, obtaining activity information of an operation item corresponding to the matched character string, generating an operation entry and displaying the operation entry in a current input page. The operation entry is a link that can jump to an operation item page.

Optionally, the method further includes: when a trigger operation is received for the operation entry, jumping to an operation item page corresponding to the operation item.

Optionally, the method further includes: receiving an updated operation item keyword from the server device when the operation item is changed, and/or, acquiring the operation item keyword from the server device periodically or at preset times.

Optionally, identifying a character string entered in an input method, and matching the identified character string to a character string corresponding to an operation item keyword obtained from a server device, includes:

detecting that one character is entered in the input method every time one character is entered in the input method, identifying a character string currently entered, and matching the character string currently identified to the character string corresponding to the operation item keyword obtained from the server device.

Optionally, the method further includes: before an end of an input, when the current matching result between a character string currently entered and the character string corresponding to the operation item keyword obtained from the server device is not consistent with the previous matching result, updating the input page and displaying the operation entry obtained for the current matching in the input page.

Optionally, matching the identified character string to the character string corresponding to the operation item keyword obtained from the server device, includes: judging whether the identified character string is included in the character string corresponding to the operation item keyword obtained from the server device, when judging that the identified character string is included in the character string corresponding to the operation item keyword obtained from the server device, determining that the identified character string is matched with the character string corresponding to the operation item keyword obtained from the server device; when judging that the identified character string is not included in the character string corresponding to the operation item keyword obtained from the server device, determining that the identified character string is not matched with the character string corresponding to the operation item keyword obtained from the server device.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for information processing, comprising:
 obtaining, via interface circuitry of an information processing apparatus, a first character string entered using an input method in a present input page;
 obtaining, by the information processing apparatus from a server device, a keyword associated with an operation task accessible by a page of the operation task;
 receiving, by the information processing apparatus, an update to the keyword associated with the operation task from the server device that is pushed by the server device when the operation task is changed; and
 in response to a last character of the first character string being received, performing:
  identifying, by processing circuitry of the information processing apparatus, the first character string;
  matching, by the processing circuitry of the information processing apparatus, the identified first character string to a second character string corresponding to the keyword associated with the operation task, the keyword having been obtained by the information processing apparatus at a time the identifying the first character string is being performed; and
  when the identified first character string is determined to match the second character string, performing:
   obtaining activity information of the operation task that is associated with the second character string; and
   displaying an operation entry in the present input page, the operation entry being generated according to the activity information and corresponding to a link of the page of the operation task.

2. The method of claim 1, further comprising:
 jumping to the page of the operation task corresponding to the operation entry when a trigger operation for the operation entry is received.

3. The method of claim 1, further comprising:
 acquiring an updated keyword associated with the operation task from the server device periodically or at preset times.

4. The method of claim 1, further comprising:
 in response to a previously entered character of the first character string, displaying the operation entry in the present input page that is generated according to previous activity information corresponding to the previously entered character; and
 in response to the last character of the first character string being received,
  when the activity information is different from the previous activity information, updating the operation entry according to the activity information, and
  when the activity information is same as the previous activity information, keeping the operation entry unchanged.

5. The method of claim 1, wherein the matching the identified first character string to the second character string comprises:
 determining whether the identified first character string is included in the second character string; and
 when the identified first character string is determined to be included in the second character string, determining that the identified first character string matches the second character string.

6. The method of claim 1, further comprises:
 obtaining additional keywords associated with the operation task from the server device, the additional keywords including a start time and an end time of the operation task; and
 obtaining a present time by the information processing apparatus,
 wherein the obtaining the activity information and displaying the operation entry are performed when the present time is between the start time and the end time and the identified first character string is determined to match the second character string.

7. The method of claim 1, wherein
 the second character string corresponds to multiple operation tasks, and
 the obtaining the activity information includes:
  identifying, based on a preset rule, one of the multiple operation tasks to be the operation task.

8. The method of claim 1, wherein
the second character string corresponds to multiple operation tasks,
the displaying the operation entry includes:
   displaying multiple operation entries corresponding to the multiple operation tasks in the present input page, and
the method further comprises:
   identifying, based on a user selection, one of the multiple operation entries to be a selected operation entry; and
   operating using the selected operation entry.

9. An information processing apparatus, comprising:
interface circuitry; and
processing circuitry configured to:
   obtain, via the interface circuitry, a first character string entered using an input method in a present input page;
   obtain, from a server device, a keyword associated with an operation task accessible by a page of the operation task;
   receive an update to the keyword associated with the operation task from the server device that is pushed by the server device when the operation task is changed; and
   in response to a last character of the first character string being received:
      identify the first character string;
      match the identified first character string to a second character string corresponding to the keyword associated with the operation task, the keyword having been obtained by the information processing apparatus at a time the identifying the first character string is being performed, and
      when the identified first character string is determined to match the second character string,
         obtain activity information of the operation task that is associated with the second character string, and
         display an operation entry in the present input page, the operation entry being generated according to the activity information and corresponding to a link of the page of the operation task.

10. The information processing apparatus of claim 9, wherein the processing circuitry is further configured to:
   jump to the page of the operation task corresponding to the operation entry when a trigger operation for the operation entry is received.

11. The information processing apparatus of claim 9, wherein the processing circuitry is further configured to:
   acquire an updated keyword associated with the operation task from the server device periodically or at preset times.

12. The information processing apparatus of claim 9, wherein the processing circuitry is further configured to:
   in response to a previously entered character of the first character string, display the operation entry in the present input page that is generated according to previous activity information corresponding to the previously entered character; and
   in response to the last character of the first character string being received and before the end of input signal is received,
      when the activity information is different from the previous activity information, update the operation entry according to the activity information, and
      when the activity information is same as the previous activity information, keep the operation entry unchanged.

13. The information processing apparatus of claim 9, wherein the processing circuitry is further configured to:
   determine whether the identified first character string is included in the second character string; and
   when the identified first character string is determined to be included in the second character string, determine that the identified first character string matches the second character string.

14. The information processing apparatus of claim 9, wherein the processing circuitry is further configured to:
   obtain additional keywords associated with the operation task from the server device, the additional keywords including a start time and an end time of the operation task; and
   obtain a present time by the information processing apparatus,
   wherein the processing circuitry obtains the activity information and displays the operation entry when the present time is between the start time and the end time and the identified first character string is determined to match the second character string.

15. The information processing apparatus of claim 9, wherein the second character string corresponds to multiple operation tasks, and the processing circuitry is further configured to:
   identify, based on a preset rule, one of the multiple operation tasks to be the operation task.

16. A non-transitory computer-readable storage medium storing a program executable by a processor to perform:
   obtaining a first character string entered using an input method in a present input page;
   obtaining a keyword associated with an operation task from a server device, the operation task being accessible by a page of the operation task;
   receive an update to the keyword associated with the operation task from the server device that is pushed by the server device when the operation task is changed; and
   in response to a last character of the first character string being received, performing:
      identifying the first character string;
      matching the identified first character string to a second character string corresponding to the keyword associated with the operation task, the keyword having been obtained by the information processing apparatus at a time the identifying the first character string is being performed; and
      when the identified first character string is determined to match the second character string, performing:
         obtaining activity information of the operation task that is associated with the second character string; and
         displaying an operation entry in the present input page, the operation entry being generated according to the activity information and corresponding to a link of the page of the operation task.

17. The non-transitory computer-readable storage medium of claim 16, wherein the program is executable by the processor to further perform:
   acquiring an updated keyword associated with the operation task from the server device periodically or at preset times.

* * * * *